United States Patent
Aboel-Nil et al.

(10) Patent No.: US 9,734,024 B2
(45) Date of Patent: *Aug. 15, 2017

(54) METHOD AND SYSTEM FOR PROCESSING EMAIL DURING AN UNPLANNED OUTAGE

(71) Applicant: MessageOne, Inc., Austin, TX (US)

(72) Inventors: Samy Mahmoud Aboel-Nil, Austin, TX (US); Satin Mirchandani, Austin, TX (US); Michael Nonemacher, Austin, TX (US); Igor Postelnik, Austin, TX (US); Michael I. Rosenfelt, Austin, TX (US); Chris Scharff, Austin, TX (US)

(73) Assignee: MessageOne, Inc., Austin, TX (US)

( * ) Notice: Subject to any disclaimer, the term of this patent is extended or adjusted under 35 U.S.C. 154(b) by 227 days.

This patent is subject to a terminal disclaimer.

(21) Appl. No.: 14/017,984

(22) Filed: Sep. 4, 2013

(65) Prior Publication Data

US 2014/0013154 A1    Jan. 9, 2014

Related U.S. Application Data

(63) Continuation of application No. 10/655,656, filed on Sep. 5, 2003, now Pat. No. 8,554,843.

(60) Provisional application No. 60/408,755, filed on Sep. 6, 2002.

(51) Int. Cl.
| | |
|---|---|
| G06F 15/16 | (2006.01) |
| G06F 11/20 | (2006.01) |
| H04L 12/58 | (2006.01) |
| H04L 29/14 | (2006.01) |

(52) U.S. Cl.
CPC ...... *G06F 11/2002* (2013.01); *H04L 12/5855* (2013.01); *H04L 12/5875* (2013.01); *H04L 51/14* (2013.01); *H04L 51/30* (2013.01); *H04L 69/40* (2013.01)

(58) Field of Classification Search
CPC ... G06Q 10/107; H04L 12/5855; H04L 29/14; G06F 11/2028; G06F 11/2025
USPC .................................................. 709/203, 206
See application file for complete search history.

(56) References Cited

U.S. PATENT DOCUMENTS

| | | | |
|---|---|---|---|
| 6,553,407 B1 * | 4/2003 | Ouchi ........................... | 709/206 |
| 7,092,998 B2 * | 8/2006 | Frietas et al. ................. | 709/217 |
| 2002/0103866 A1 | 8/2002 | Chi et al. | |
| 2002/0120748 A1 | 8/2002 | Schiavone et al. | |
| 2003/0050984 A1 * | 3/2003 | Pickup et al. ................ | 709/206 |

(Continued)

OTHER PUBLICATIONS

Notice of Allowance dated Sep. 3, 2013, mailed in U.S. Appl. No. 10/655,656, pp. 1-19.

(Continued)

*Primary Examiner* — Tonia L Dollinger
*Assistant Examiner* — Kishin G Belani

(57) ABSTRACT

The method and system of the present invention provides an improved technique for processing email during an unplanned outage. Email messages are redirected from the primary server to a secondary server during an unplanned outage such as, for example, a natural disaster. A notification message is sent to users alerting them that their email messages are available on the secondary server by, for example, Internet access. After the termination of the unplanned outage, email messages received during the unplanned outage are synchronized into the users standard email application.

9 Claims, 3 Drawing Sheets

(56) References Cited

U.S. PATENT DOCUMENTS

2003/0191781 A1* 10/2003 Civanlar et al. ............. 707/200
2004/0039889 A1 2/2004 Elder et al.
2004/0153709 A1* 8/2004 Burton-Krahn ................. 714/4

OTHER PUBLICATIONS

Decision on Appeal dated Aug. 1, 2013, mailed in U.S. Appl. No. 10/655,656, pp. 1-12.
Reply Brief under 37 C.F.R. § 41.41, as filed in U.S. Appl. No. 10/655,656 on Sep. 30, 2010, pp. 1-21.
Examiner's Answer dated Jul. 30, 2010, mailed in U.S. Appl. No. 10/655,656, pp. 1-69.
Response to Notification of Non-Compliant Appeal Brief under 37 C.F.R. § 41.37 as filed in U.S. Appl. No. 10/655,656 on Apr. 29, 2010, pp. 1-7.
Examiner's Answer dated Dec. 1, 2009, mailed in U.S. Appl. No. 10/655,656, pp. 1-63.
Response to Notification of Non-Compliant Appeal Brief under 37 C.F.R. § 41.37 as filed in U.S. Appl. No. 10/655,656 dated Aug. 21, 2009, pp. 1-3.
Appeal Brief as filed in U.S. App. No. 10/655,656 dated Jul. 7, 2009, pp. 1-25.
Notice of Non-Compliant Appeal Brief dated Apr. 15, 2010, mailed in U.S. Appl. No. 10/655,656, pp. 1-2.
Order Returning Undocketed Appeal to Examiner dated Mar. 29, 2010, mailed in U.S. Appl. No. 10/655,656, pp. 1-5.
Notice of Non-Compliant Appeal Brief dated Aug. 12, 2009, mailed in U.S. Appl. No. 10/655,656, pp. 1-2.
Final Office Action dated May 11, 2009, mailed in U.S. Appl. No. 10/655,656, pp. 1-64.
Response to Non-Final Office Action dated Jul. 25, 2008, as filed in U.S. Appl. No. 10/655,656 on Jan. 26, 2009, pp. 1-27.
Non-Final Office Action dated Jul. 25, 2008, mailed in U.S. Appl. No. 10/655,656, pp. 1-78.
Request for Continued Examination (RCE) and RCE Submission as filed in U.S. Appl. No. 10/655,656 on May 16, 2008, pp. 1-34.
Final Office Action dated Nov. 16, 2007, mailed in U.S. Appl. No. 10/655,656, pp. 1-76.
Response to Non-Final Office Action dated Apr. 30, 2007, as filed in U.S. Appl. No. 10/655,656 dated Sep. 7, 2007, pp. 1-53.
Non-Final Office Action dated Apr. 30, 2007, mailed in U.S. Appl. No. 10/655,656, pp. 1-101.
PCT International Search Report of the International Searching Authority for PCT/US03/27736, dated Apr. 8, 2004, pp. 1-2.
Supplementary European Search Report mailed by the European Patent Office in European Patent Application No. 03749419 on Jul. 24, 2009, pp. 1-4.
Communication pursuant to Article 94(3) EPC dated Oct. 8, 2009, mailed by the European Patent Office in European Patent Application No. 03749419.2, pp. 1-5.
Response to Communication pursuant to Article 94(3) EPC dated Oct. 8, 2009, as filed in he European Patent Office in European Patent Application No. 03749419.2 on Mar. 16, 2010, pp. 1-24.
Communication under Rule 71(3) of Intention to Grant dated Aug. 5, 2011, mailed by the European Patent Office in European Patent Application No. 03749419.2, pp. 1-25.
Final Office Action dated Jun. 16, 2011, mailed in U.S. Appl. No. 12/723,353, pp. 1-44.
Response to Non-Final Office Action dated Oct. 6, 2010, as filed in U.S. Appl. No. 12/723,353 dated Apr. 6, 2011, pp. 1-14.
Non-Final Office Action dated Oct. 6, 2010, mailed in U.S. Appl. No. 12/723,353, pp. 1-85.

* cited by examiner

METHOD AND SYSTEM FOR PROCESSING EMAIL DURING AN UNPLANNED OUTAGE

PRIORITY STATEMENT UNDER 35 U.S.C. §119 & 37 C.F.R. §1.78

This application is a continuation of U.S. patent application Ser. No. 10/655,656 filed Sep. 5, 2003, which claims priority based upon prior U.S. Provisional Patent Application Ser. No. 60/408,755 filed Sep. 6, 2002 in the names of Michael I. Rosenfelt and Satin Mirchandani, entitled "System For Providing Backup Electronic Messaging Services During Unplanned Outages."

BACKGROUND OF THE INVENTION

Technical Field of the Invention

The present invention relates generally to a method and system for processing email during an unplanned outage. More particularly, the present invention provides for the redirection of email during an unplanned outage, notifies users that alternative access is available to said email, and restores messages received during the unplanned outage into the users' original email system to maintain the integrity of the email file.

Description of Related Art

Everyday more and more companies are concluding that email messaging is a mission critical application worthy of inclusion in a business continuity plan. Previously, companies that made this decision had no alternative but to implement expensive and complex systems. Traditionally, the solution has been to replicate the company's entire email system, such as a Microsoft Exchange database, in a remote datacenter on hardware similar to that owned by the company. Because of the complexity of such system, such as Microsoft's Exchange architecture, replication strategies have focused on real-time database replication of disks at the byte level or, alternatively, on transferring offline database backups on a server-by-server basis.

Even in cases where a company implements complete replication of its databases, it is not uncommon for there to be gaps in email continuity due to, for example, database corruption, the presence of viruses, denial of service attacks, security breaches and other factors. Some of the most often cited problems with replication are:

1. High Cost. The cost involved in replication can be staggering. In order to implement an effective replication system, the company must purchase third party replication software, acquire network bandwidth, secure server capacity, retain administrative support and then monitor each of these systems.
2. Replication of Only a Subset of the Servers. As a result of the costs inherent in providing a replicated database, such as, for example, the cost of hardware, software, bandwidth and support personnel, it is common for only a few of the most critical servers to be replicated.
3. Database Corruption. Because replication technology by its very nature mirrors the files from one server onto another, a corrupt file on the original server will be mirrored in its corrupt form on the backup server. There is currently no efficient means for preventing the mirroring of corrupt files.
4. Incapacitation Due to Virus. Similarly, if a virus occurs in a file on the original server, it will be transported to the second server. Server corruption due to viruses can cause email outages for days.
5. Transactional Inconsistency. Because replication solutions typically perform byte-level replication of the disks, they do not provide integrity for the Exchange transaction boundaries. For example, a single transaction on Microsoft Exchange may consist of ten sequential writes to the disk. If the replication software has only replicated eight of those ten at the time of an outage, then the backup will be incomplete, resulting in a corrupt file which may fail to mount.
6. No Vendor-Supported Replication Solution. Currently no system that replicates systems like the Microsoft Exchange database is readily available at an economical price.
7. Complexity of Replication. The complexity of making an efficient, effective replication solution causes the system to be more prone to failure and thereby require greater resources to maintain.

For all of these reasons the existing technology fails to provide an adequate method for processing email during an unplanned outage. There is a need, therefore, for an improved method and system for processing email during an unplanned outage.

SUMMARY OF THE INVENTION

The present invention relates generally to a method and system for processing email during an unplanned outage and substantially departs from the conventional concepts and designs of the prior art. More particularly, the present invention comprises the steps of managing users' email; redirecting inbound email messages from a primary server to a secondary server when said primary server is unavailable; notifying said users that the redirection of inbound email messages has been implemented; providing the users with access to the email addresses on a secondary server while the primary server is unavailable; notifying users when the primary server is again available; and incorporating the email messages received while the primary server was unavailable into the software for managing users' email so as to create a complete email history.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS OF THE INVENTION

The numerous innovative teachings of the present application will be described with particular reference to the presently preferred exemplary embodiments. However, it should be understood that these embodiments provide only a few examples of the many available embodiments and advantageous uses of the innovative teachings described herein. In general, statements made in the specification of the present application do not necessarily delimit any of the various claimed inventions. Moreover, some statements may apply to some inventive features, but not to others.

Figure 1:
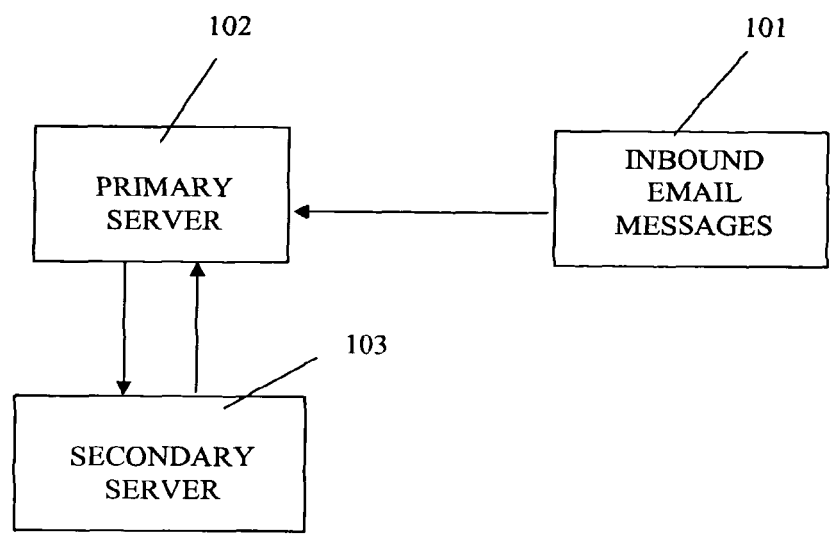
FIG. 1 is a flow diagram of a typical prior art replication process.

FIG. 1 is a flow diagram of a typical replication process. Inbound email messages 101 are received and processed on the primary server 102. On a periodic basis, the information on the primary server 102 is replicated on a secondary server 103. The replication process can occur at the byte level, the file level or the disk level. In some cases, the replication system is configured such that only files or disks to which changes have been made are replicated. In the event of an outage of the primary server, the secondary server is activated. However, because the primary server 102 and the secondary server 103 do not act in concert, it is necessary to take the primary server 102 completely offline before activating the secondary server 103. Moreover, it is not possible to test the efficacy of the replication system by transferring only a few users from the primary server 102 to the secondary server 103. Also, because of the complexities in transferring from the primary server 102 to the secondary server 103, it can take as long as 30 to 60 minutes to complete a transfer at the time of an outage.

Figure 2:
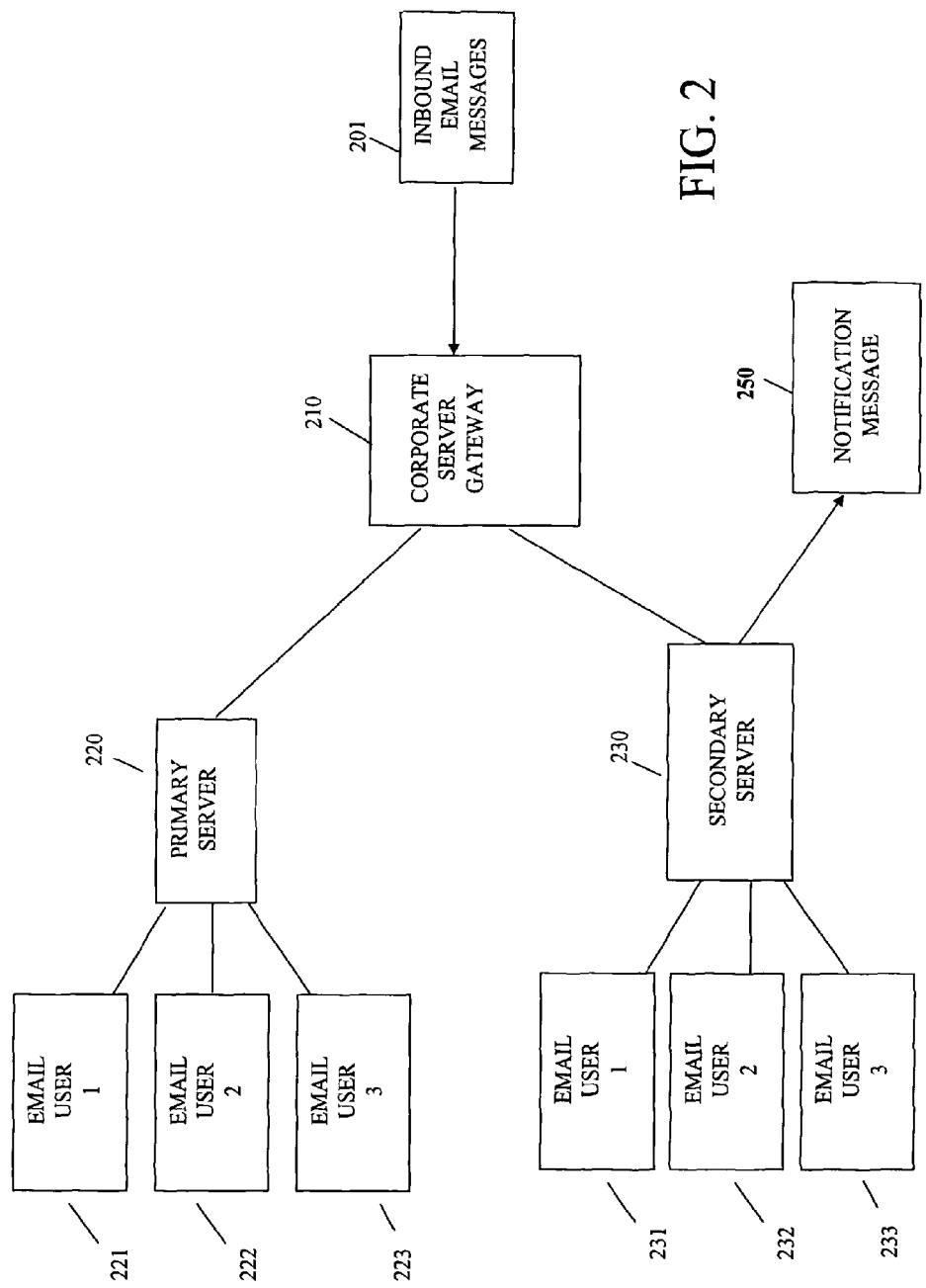
FIG. 2 is a diagram showing the preferred method of the present invention for processing email during an unplanned outage.

FIG. 2 shows a diagram outlining the preferred method for processing email during an unplanned outage. In general, inbound email messages 201 are redirected from a primary server 220 to a secondary server 230 when said primary server 220 is unavailable. Users are notified that email messages 201 have been redirected and those users are provided access to their email messages 201 via the secondary server 230. Users are again notified when the primary server 220 is available. Thereafter, the email messages 201 that were received while the primary server 220 was unavailable are synchronized with the preexisting email messages 201 on the primary server 220 to create a continuous email history.

In an exemplary embodiment of the invention, inbound email messages 201 are sent to a server gateway 210. In a corporate environment, inbound email messages may be sent from customers, vendors, partners, suppliers and the like. In a typical environment, inbound email messages are routed to an email application 240 residing on the primary server 220. A registry of all email addresses residing on the primary server 220 is kept either on the primary server 220 or on the server gateway 210. In some cases, the method of determining the email addresses that reside on the primary server 220 utilizes functionality inherent within the email application 240. In other cases, the method of determining the email addresses that reside on the primary server 220 may be an independent program operating autonomously.

Next, email addresses that are redundant to the email addresses residing on the primary server 220 are created on the secondary server 230. The secondary server 230 can be located remotely from the server gateway 210 and may be connected, for example, through the internet. In most cases, a message will be employed whereby the email addresses on the secondary server 230 will be updated on a periodic basis to replicate the email addresses on the primary server 220. This creation of redundant email addresses on the secondary server 230 is continued on an ongoing basis.

A method is next employed to detect whether email addresses that reside on the primary server 220 are detectable to inbound email messages 201. In some cases, this detection can be as simple as monitoring the email flow for error messages indicating a delivery failure. In other cases, an automated method may be employed which continually monitors a flow of inbound messages 201 to determine whether they are received on the primary server 220 as intended.

At such time as the email addresses that reside on the primary server 220 are not detectable to inbound email messages 201, the inbound email messages 201 are redirected from the primary server 220 to the secondary server 230. The transition from the primary server 220 to the secondary server 230 can be done automatically to determine that the email addresses on the primary server 220 are not being detected by inbound email messages 201. It is also possible to direct only a portion of the inbound email messages 201 from the primary server 220 to the secondary server 230 in cases where only a portion of the email addresses residing on the primary server 220 are undetectable to inbound email messages 201. Similarly, a decision may be made to transfer all inbound email messages from the primary server 220 to the secondary server 230 even though only a portion of the email addresses on the primary server 220 are undetectable to inbound email messages 201. In those cases, for example, where it appears that primary server 220 may be prone to additional failure. It may also be desirable in those cases where the transition from the primary server 220 to the secondary server 230 is performed manually, to implement a password protection scheme whereby ability to effectuate the transition requires the entering of a password.

At the time, or immediately after, inbound email messages 201 have been redirected to the secondary server 230, a notification is sent to users alerting them that email messages are available on the secondary server 230. The notification method may consist, for example, of the automated delivery of notification messages 250 to an alternate email address for each of the users. Each of the users 231, 232 and 233 will have access to the secondary server 230 over the internet or a wide area network. The aforementioned notification messages 250 can be sent to, for example, cellular telephones, personal digital assistance, pagers and the like.

During the period that inbound email messages 201 are directed to the secondary server 230, continual assessment is underway to determine when email addresses, residing the primary server 220, are again detectable to inbound email messages 201. This activity may take the form of, for example, periodically pinging the email addresses residing on the primary server 220 and evaluating whether a response is received.

Once the primary server 220 is again available, inbound email messages 201 that had been directed to the secondary server 230 can be redirected back to the primary server 220. At that time, users can be notified that the primary server 220 is again operational and that their traditional email application 240 is functioning. The notification to users can again be in the form of a notification message delivered to each user's alternate email address.

Once inbound email messages 201 are successfully redirected to the primary server 220, inbound email messages 201 that had been received on the secondary server 230 during the outage can be synchronized into the email application 240 thereby creating a comprehensive email history within the email application 240.

It is important to understand that in this preferred embodiment there is no need to take the primary server 220 completely offline in order to test the efficacy of the secondary server 230. In addition, there is no significant cost inherent in testing the efficacy or functionality of the secondary server 230. In addition, the ability to transfer only a portion of the email addresses residing on the primary server 220 to the secondary server 230 provides a tremendous benefit. For example, if only a limited number of email addresses residing on the primary server 220 are affected, then only the inbound email messages 201 intended for those email addresses can be redirected to the secondary server 230. In another example, after an outage has occurred, it is possible to redirect the inbound email messages 201 back to the primary server 220 on a limited basis to test the viability of the primary server 220 without the need to transfer all of the addresses on the secondary server 230 to the primary server 220. This functionality permits a gradual transition back to the affected primary server 220. Also, redirecting inbound email messages 201 from the primary server 220 to the secondary server 230 can be effectuated in less than two minutes compared to the 30-60 minutes required in traditional replication systems.

Figure 3:
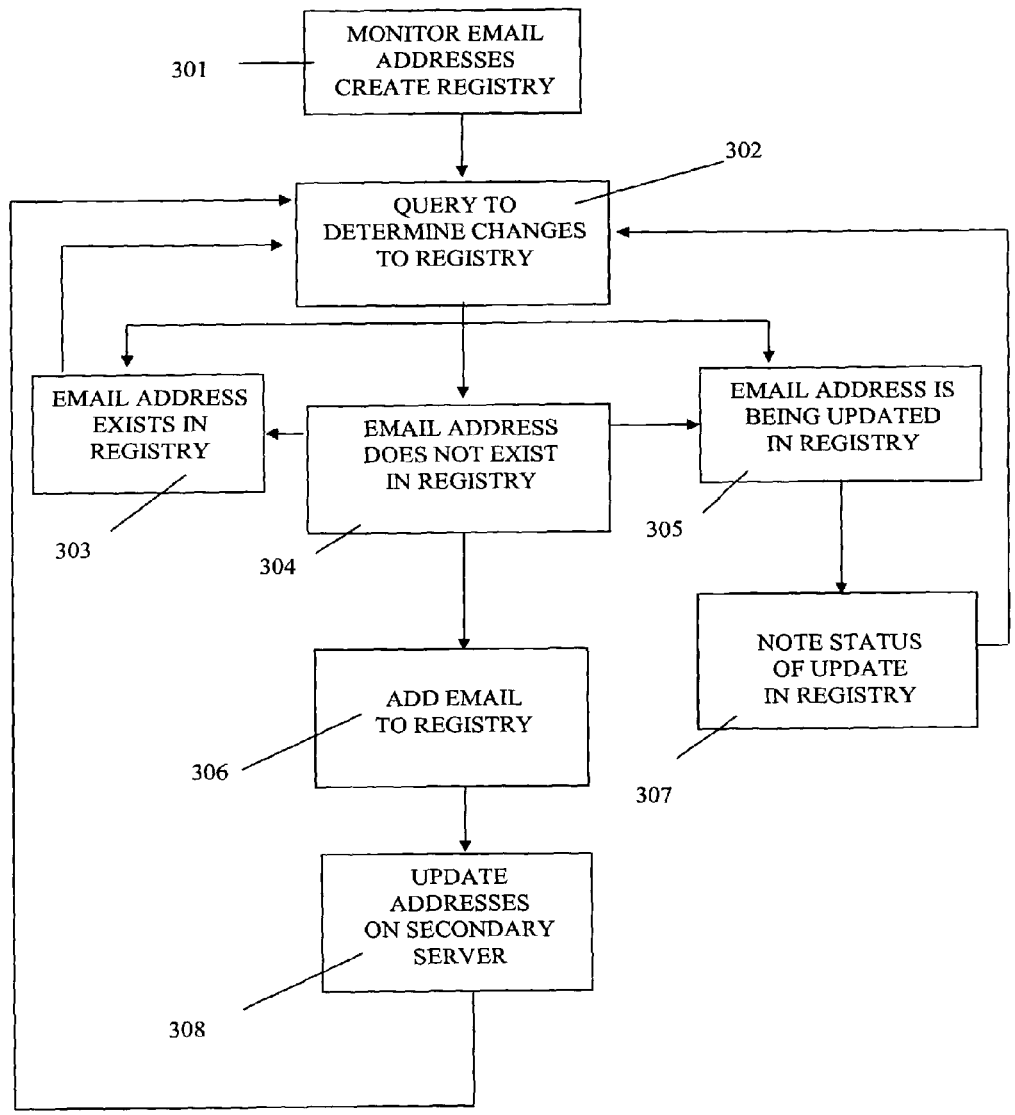
FIG. 3 is a diagram showing a method for replicating email addresses on a secondary server.

FIG. 3 is a diagram showing a method for replicating email addresses on a secondary server. In the initial step, email addresses that reside on a primary server are monitored using a means independent from the email application used to process email messages to create a registry of existing email addresses 301. Periodically, a query 302 is sent to the primary server to determine changes to the registry. More specifically, the query will seek to determine whether email addresses exist in the registry 303, if there are email addresses that do not exist in the registry 304, or whether the email addresses are currently being updated in the registry 305. If the email address exists in the registry 303, then no further action is taken and the system repeats the query on a 302 on a periodic basis. If the email addressed does not exist in registry 304, then the email address is added to the registry 306 and the address is updated on a secondary server 308. Thereafter, additional queries 302 are run on a periodic basis. Finally, if the email address is being updated in the registry 305, that status is noted in the registry 307 and the added queries are run in the future to determine the updated status.

What is claimed is:

1. A method for providing backup electronic messaging services during unplanned outages, comprising:
   redirecting email messages from a primary server to a secondary server when said primary server is unavailable;
   providing intended recipients of said email messages with access to said email messages on said secondary server while said primary server is unavailable; and
   incorporating said email messages received while said primary server was unavailable into said intended recipient's primary email file so as to create a continuous email history.

2. A method for processing email during an unplanned outage comprising:
   using software for managing users' email;
   redirecting inbound email messages from a primary server to a secondary server when said primary server is unavailable;
   providing said users with access to said email addresses on said secondary server while said primary server is unavailable; and
   incorporating said email messages received while said primary server was unavailable into said software for managing users' email so as to create a complete email history.

3. The method of claim 2, wherein said primary server is located remotely from said secondary server and interconnected to said secondary server through the Internet.

4. The method of claim 2, wherein said email addresses on said primary server are periodically replicated on said secondary server so that the transition from said primary server to said secondary server is seamless.

5. The method of claim 2, further including manually determining the availability of said primary server by assessing whether an error message has been received indicating an inability to deliver said inbound email message.

6. The method of claim 2, wherein redirecting said inbound email addresses of said users on said primary server to said secondary server is automatically performed at any time said primary server is unavailable.

7. The method of claim 2, wherein redirecting said inbound email addresses of said users on said primary server to said secondary server is performed after some, but less than all, of said inbound email messages are undetectable.

8. The method of claim 2, further including determining the availability of said primary server by periodically pinging said email addresses on said primary server and evaluating whether a response is received.

9. The method of claim 2, wherein redirecting said inbound email messages from said primary server to said secondary server is password protected.

* * * * *